July 3, 1923.
C. A. WHITSETT
SPOTLAMP
Filed May 14, 1920
1,460,777
3 Sheets-Sheet 1
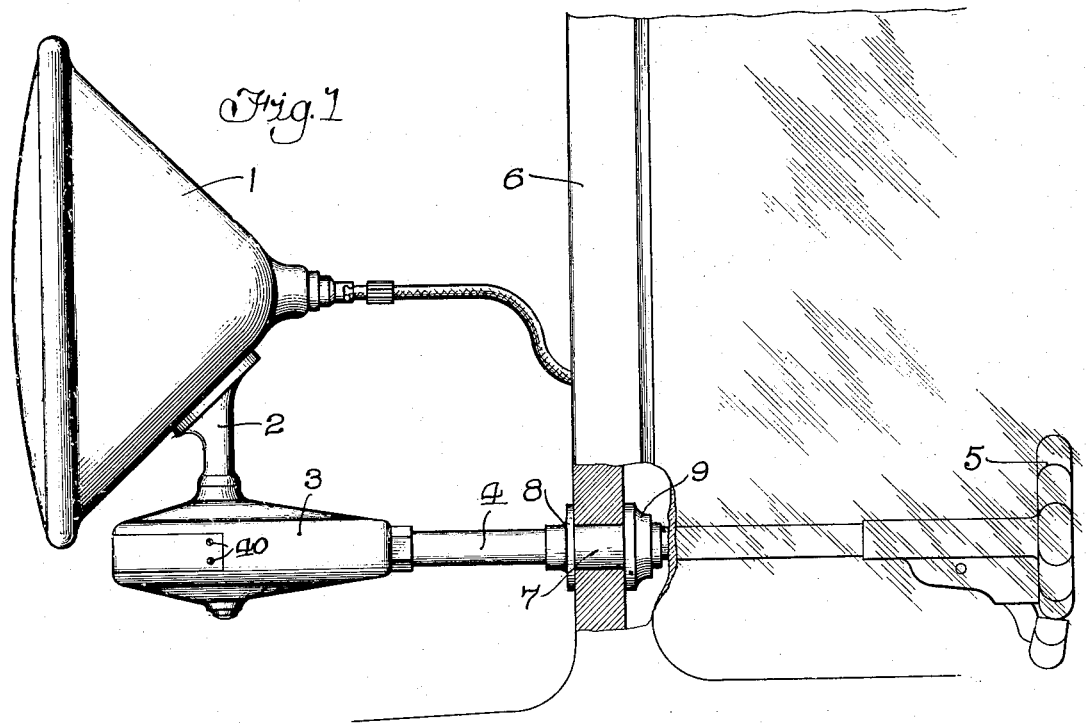
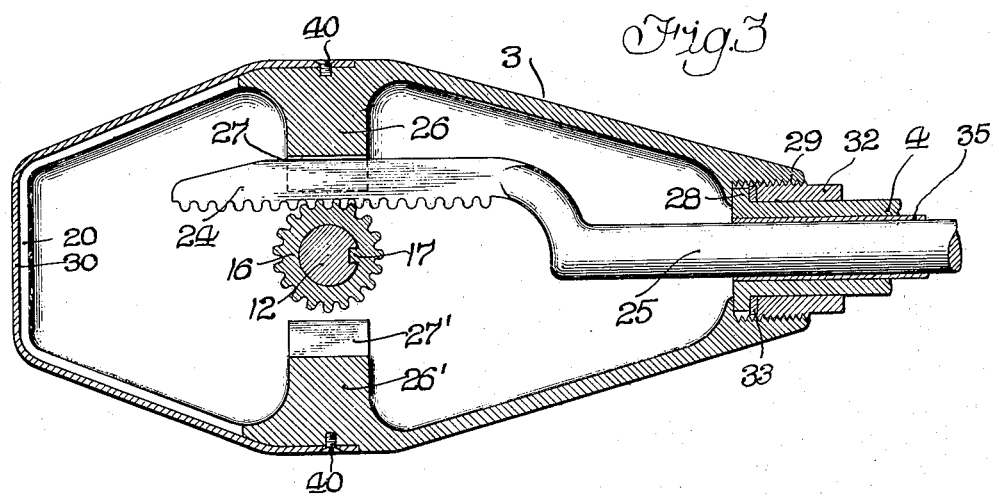
Inventor
Cameron A. Whitsett

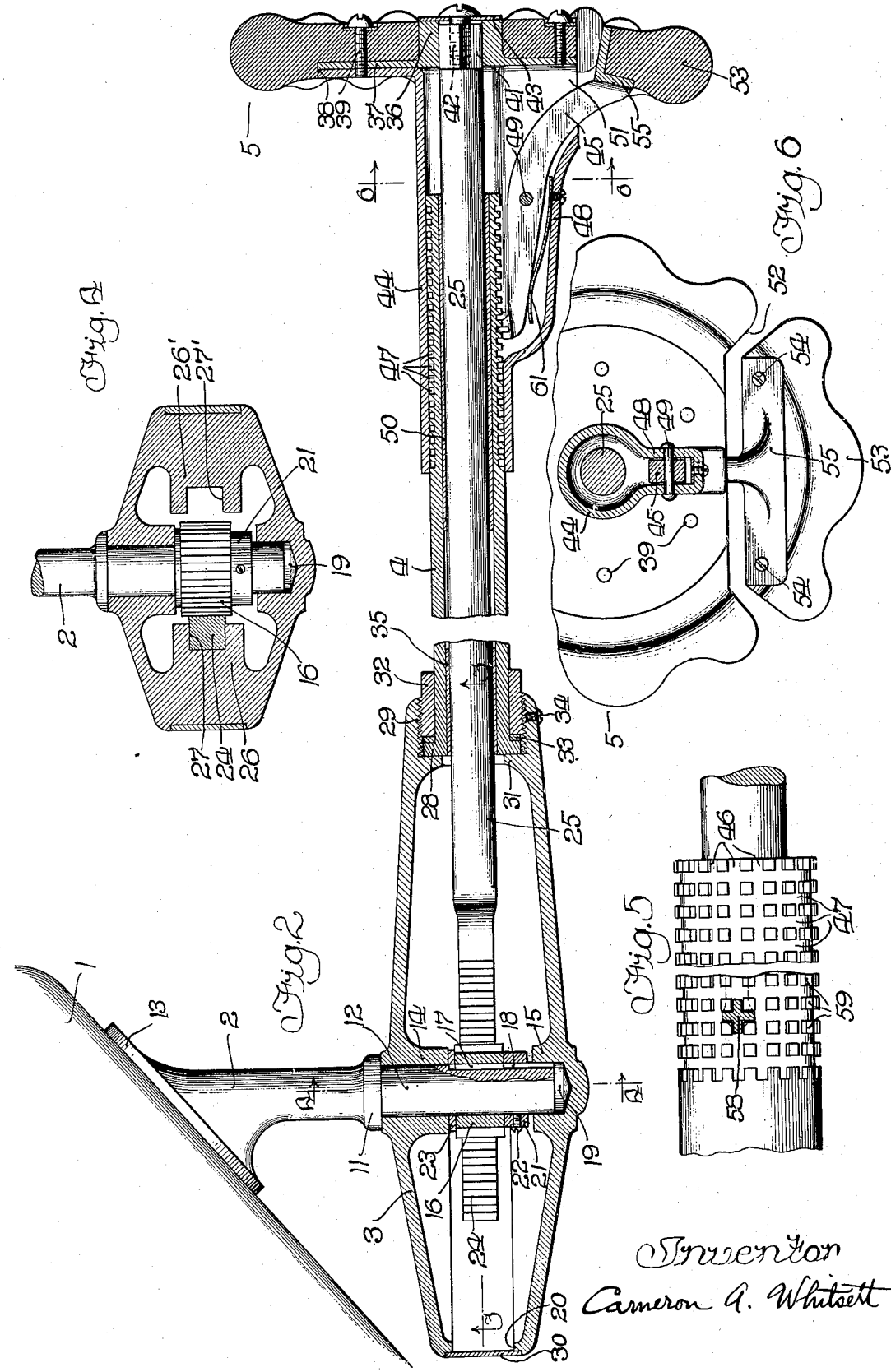

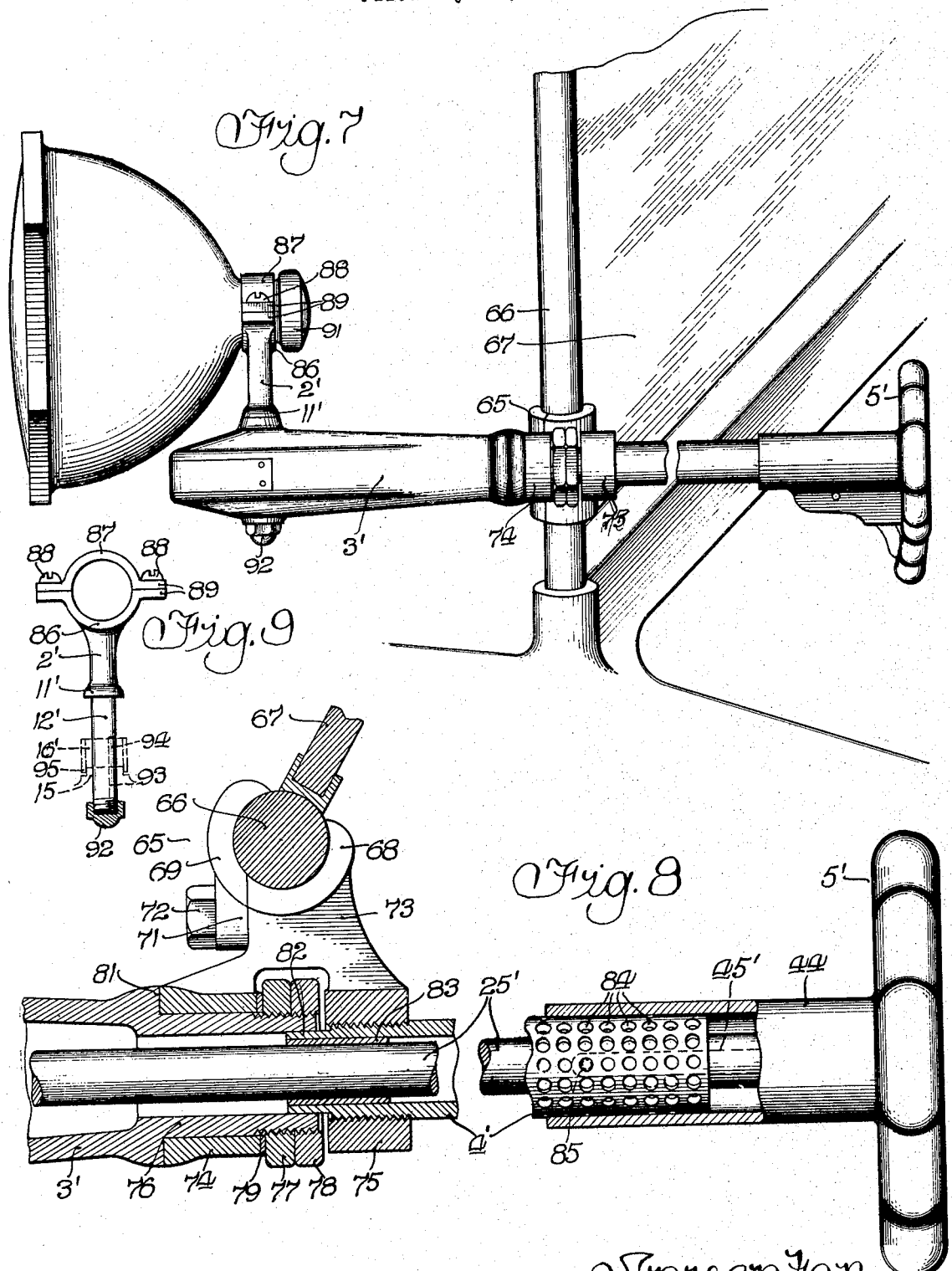

Patented July 3, 1923.

1,460,777

UNITED STATES PATENT OFFICE.

CAMERON A. WHITSETT, OF CHICAGO, ILLINOIS.

SPOTLAMP.

Application filed May 14, 1920. Serial No. 381,370.

*To all whom it may concern:*

Be it known that I, CAMERON A. WHITSETT, a citizen of the United States, residing at Chicago, in the county of Cook and State of Illinois, have invented a certain new and useful Improvement in Spotlamps, of which the following is a full, clear, concise, and exact description, reference being had to the accompanying drawings, forming a part of this specification.

The present invention relates to spot lamps for automobiles, motor boats and the like. More specifically the invention is concerned with automobile spot lamps which are operable from a control mechanism located in the driver's compartment. One of the particular advantages residing in this control feature is the greater facility and convenience of operation afforded by disposing the control mechanism in convenient position adjacent the steering wheel. The preeminent advantage, however, is the ability to operate the spot lamp from within the driver's compartment in any type of car and under any condition.

For example, this control feature permits convenient operation of the spot lamp when the side curtains of the car are down, without necessitating unfastening the side curtains and exposing the hand or arm to the weather. Spot lamps having this interior control feature are particularly adaptable to use on limousines and other closed cars, and, in fact, are the only types of spot lamps which can be practically mounted on a closed type of car.

The primary object of the present invention is to simplify and facilitate the operation of such types of spot lamps, by providing an improved and simplified form of control mechanism which can be operated with the utmost facility. This control mechanism employs but one operating handle, through the manipulation of which the lamp may be adjusted through its vertical and horizontal planes of adjustment. The two adjustments in both planes are effected through this single control handle by arranging the latter to have a translational as well as a rotational adjusting motion. By this arrangement, the necessity for two operating handles has been eliminated, and, furthermore, this construction of control mechanism is devoid of all clutches and such similar mechanisms as have heretofore been employed for utilizing the motion of a single control hand to angularly adjust a spot lamp in its different planes of adjustment.

A secondary object of the invention is to provide an improved form of positive lock or detent for locking the lamp in any adjusted position. This improved form of lock is so devised that the releasing of the lock is effected simultaneously with the operation of actuating the control handle, and consequently, the operation of the lock does not hinder or encumber the adjustment of the spot lamp.

A further object of the invention is to provide a construction of rotatable head or housing for supporting the spot lamp, which will have pivotal support directly upon the body of the vehicle. This is to provide a maximum degree of strength and rigidity to the housing and to the spot lamp against the vibration and jarring of the car.

A further object of the invention is to provide a simplified form of control mechanism, comprising a minimum number of parts and capable of manufacture and assembly at minimum cost. This is with the view to providing a form of control mechanism which can be manufactured at sufficiently low cost for sale to the small car owner, or for use with the cheaper grades of spot lamps. In this connection I also contemplate devising a system of mounting appliances for the control mechanism which will universally and interchangeably receive different forms and styles of spot lamps, so that the control mechanism may be sold as a separate appliance for use with any of the conventional forms of spot lamps now on the market.

Although the invention is primarily directed to spot lamps for mounting on or adjacent the wind shields of automobiles and the like, I wish it to be understood that the purview of the invention includes other forms of lamps than the so called spot lamp, including lamps such as might be situated at a point relatively remote from the wind shield.

The invention is illustrated in the accompanying drawings, wherein a preferred embodiment thereof is shown, and in which:

Figure 1 is a view illustrating the mounting of my improved form of spot lamp on a closed type of car;

Figure 2 is an enlarged longitudinal sectional view through the lamp operating and control mechanism;

Figure 3 is a horizontal sectional view taken on the plane of the line 3—3 of Figure 2;

Figure 4 is a vertical sectional view taken on the plane of the line 4—4 of Figure 2;

Figure 5 is an enlarged elevational view illustrating the formation of the locking serrations on the end of the housing sleeve;

Figure 6 is a fragmentary sectional view of the control handle, taken on the plane of the line 6—6 of Figure 2;

Figure 7 is a view illustrating a modified construction of my invention as mounted on an open body type of car;

Figure 8 is an enlarged horizontal sectional view through the mounting bracket and related parts; and Figure 9 is a detail view of one of the interchangeable stems.

In Figure 1 I have illustrated my improved form of spot lamp as mounted on a limousine type of car. The spot lamp proper, which is broadly designated 1, is mounted on a vertical stem or spindle 2 which is rotatably supported in a revolvable housing 3. The housing 3 is supported on the end of a supporting sleeve 4 which extends back into the closed interior of the car and is provided at its inner end with a control handle 5. The sleeve 4 is preferably extended through the corner rail 6 of the limousine top, although it is conceivable that the sleeve might be extended through the jamb strip of the windshield, or might be made to enter the interior of the car at any other preferred point. In the arrangement illustrated, however, the sleeve 4 has rigidly secured thereto a short sleeve 7 which has an outer collar or curved plate 8 for engaging against the outside corner of the rail 6. An adjustable collar 9 is mounted on the sleeve 7 on the inside of the rail 6, this collar being either threaded or pinned to the sleeve 7 in firm engagement with the rail 6, for rigidly mounting the sleeve 4 in position. The sleeve 4 is preferably extended through the corner rail 6 at a slight outward angle so as to dispose the control handle 5 adjacent the steering wheel in convenient position for operation. The manner of mounting my improved spot lamp upon an open body type of car will be hereinafter described in connection with Figures 7 and 8.

Referring now to the detail construction of the lamp operating mechanism, and with particular reference to Figures 2, 3, and 4, it will be noted that the stem 2 is formed with a collar 11 which bears upon the top of the housing 3, and is also formed with a lower reduced portion 12 which extends into the housing 3 for pivotal support therein. The upper end of the stem 2 is suitably fastened to the lamp 1 in any preferred manner, such as by the mounting plate 13 which is screwed to the body of the lamp 1. The reduced stem portion 12 is journaled in upper and lower bosses 14 and 15, which are formed integrally with the housing 3 and project inwardly from the top and bottom thereof. Mounted on the reduced portion 12, intermediate the bosses 14 and 15, is a small spur pinion 16. This spur pinion is formed with a key 17 which is adapted to enter a key-slot 18 (Figure 3), which is cut in the stem portion 12 and extends upwardly from the lower end thereof. The lower end of the stem portion 12 sets in a bore 19 in the boss 15, this bore being only extended sufficiently to form a bearing support for the lower end of the stem portion. The stem is held in the housing 3 by a collar 21, which is adapted to be drawn up against the bottom of the pinion 16 and retained in position by a set screw 22. A washer 23 is preferably interposed between the pinion 16 and the boss 14.

Meshing with the spur pinion 16 is a rack bar 24 which projects in offset relation from the end of an operating shaft 25. The operating shaft 25 is extended back through the supporting sleeve 4, and has operative connection with the control handle 5, as I shall hereinafter describe. The rack bar 24 is guided for reciprocating motion in a slotted web 26, which extends inwardly from the side wall of the housing 3. The head 3 is preferably constructed as a die casting, and as will be noted from Figure 3, it is conformed to have a maximum width in the transverse plane of the stem 12, from which point it is formed with a converging taper extending to the rear and to the front in diamond formation. The web portion 26 is preferably cast integral with the side of the hous'ng, and is formed with a horizontal slot 27 extending therethrough for receiving the rack bar 24. A similar web portion 26', provided with a slot 27', is also formed on the opposite side wall of the housing, for permitting a transposal of the rack bar 24 into meshed relation with the other side of the spur pinion 16. This is for the purpose of reversing the direction of angular oscillation of the lamp, either for individual conven'ence, or when transposing the lamp from one side of the car to the other. The front half of the housing 3 is formed with a horizontal slot or opening 20, which extends through the housing from side to side (Figure 3), for affording access to the interior of the housing in order to permit insertion of the spur pinion, etc. This slotted opening is closed by a plate 30, which extends across the front and around the sides of the housing. The plate 30 is set in grooves in the edges of the opening 20 and is secured in place by screws 40. The rack bar 24 is preferably of a length only slightly shorter than the circumference of the pitch circle of the spur pinion 16, so that a complete reciprocation of the rack bar will revolve the stem 2 and lamp 1 through approximately a complete circle. The pitch circle of the spur pinion 16 is preferably of such length that the extent of reciprocation of the operating shaft 25, in swinging the lamp through its complete range, is not more than three or four inches.

This rotation of the spot lamp 1 about the axis of the stem 2 affords angular adjustment of the lamp in one plane. Angular adjustment in the other plane is obtained by revolving the housing 3 about the axis of the supporting sleeve 4. As will be noted in Figure 2, this stationary sleeve has formed, on the outer end an external flange or collar 28. This end of the sleeve is extended into a threaded counterbore 29, which is machined in the rear end of the housing 3. The flange 28 on the sleeve 4 is made to bear against an internal flange 31, which is formed integrally with the inner wall of the housing. The flange 28 is forced snugly up against the internal flange 31 by an externally threaded nut 32 which threads into the counterbore 29. A washer 33 of fibre or the like is interposed between the flange 28 and the nut 32. A similar washer may be interposed between the flanges 28 and 31 to provide a suitable frictional surface without necessitating the accurate machining of these parts. The nut 32 is adapted to be slipped over the sleeve 4 before the mounting sleeve 7 or control handle 5 are assembled over the sleeve, and by adjusting this nut any desired tension may be imposed on the rotatable connection of the housing 3, so as to offset the tendency of the weight of the lamp 1 to revolve the housing 3 down out of adjusted position. A set screw 34 threads up through the bottom of the housing, and is adapted to lock the nut 32 in any adjusted position. The operating shaft 25 is extended back through the sleeve 4 for connection with the operating handle 5, the shaft being guided in the front end of the sleeve 4 by a small spacing sleeve 35, and in the rear end of the sleeve 4 by a spacing sleeve 50. It will be apparent that rotation of the operating shaft 25 will be transmitted to the housing 3 through the slot 27 and web portion 26, so that the entire housing 3 together with the stem 2 and lamp 1 will revolve about the rotatable mounting on the end of the supporting sleeve 4. By this revolving motion of the operating shaft 25, the angular adjustment of the spot lamp in the vertical plane is obtained.

The operating handle 5 consists of a wheel having a notched or serrated periphery, this wheel being constructed of vulcanite or any other suitable material, preferably of a character which will enhance the appearance of the device. When the wheel is constructed of vulcanite or like material it is provided with a metallic hub 36, which is rigidly mounted in the body of the wheel by a rear plate or flange 37 which sets in an annular recess in the rear face of the wheel. A plurality of small screws 39 are extended through from the front of the wheel to tap into the plate 37 and rigidly fasten the hub 36 in the wheel. The hub 36 is formed with a squared or polygonal opening for receiving the correspondingly formed end 41 of the operating shaft 25. The handle 5 is drawn firmly onto the end of the operating shaft 25 by a screw 42 which extends through a washer 43, bearing on the outer face of the hub 36, and taps into a threaded hole bored in the end of the shaft 25.

Extending forwardly from the handle 5 is a housing sleeve 44, which supports and encloses the lock mechanism provided for locking the lamp control mechanism in its various positions of adjustment. The sleeve 44 is attached to the handle 5 by the provision of a flange or plate 38 on the end thereof, which abuts the flange 37 and receives the ends of the screws 39. The locking mechanism comprises a locking lever 45 and a series of longitudinal and annular locking serrations or grooves 46 and 47 in the end of the stationary sleeve 4. The locking lever 45 is pivoted in a depressed channel 48, which extends downwardly from the bottom of the enclosing sleeve 44. The lever 45 is pivoted in this channel shaped depression on a pivot pin 49, which is extended through the lever 45 and is suitably fastened in the walls of the channel portion 48. The outer end of the locking lever 45 extends downwardly and outwardly of the sleeve 44 through a slotted opening 51 in the bottom of the channel portion 48. As shown in Figure 6, the lower part of the operating handle 5 is notched out through a considerable portion of its periphery, as indicated at 52, for the reception of a lock releasing segment 53. This lock releasing segment is carried on the lower end of the locking lever 45, being fastened by screws 54 in an angular mounting plate 55 which is formed integral with the end of the locking lever. The segment 53 is configured similarly to the control handle 5, having a notched or serrated periphery, and is formed to closely set within the notched recess 52 in the control handle.

The other end of the locking lever 45 is formed with two transverse locking ribs, which intersect in the form of a small cross, as indicated at 58 in Figure 5. This locking cross is adapted to project into the longitudinal and annular locking grooves 46 and 47, for the purpose of locking the lamp in any of its adjusted positions. These locking grooves are spaced uniformly—both longitudinally and angularly—and it will be observed that these grooves form a multiplicity of small studs 59 between which the locking cross 58 is adapted to enter. The locking lever 45 is normally held in locking engagement in the grooves under the tension of a leaf spring 61, fastened in the bottom of the channel depression 48, or under the tension of any other suitable spring. When the locking lever is engaging in these grooves, it will be noted that the operating handle 5 is positively locked against longitudinal motion by the engagement of the locking cross 58 in the circumferential grooves 47. It will also be noted that the operating handle is also positively locked against rotatable motion by the engagement of the locking cross 58 in the longitudinal grooves 46. To release the lock, the lock releasing segment 53 is merely "squeezed" into the body of the operating handle 5, this motion being a natural result following subconsciously from the simple act of grasping the operating handle 5. In making an adjustment of the lamp the handle 5 is then shifted either backwards or forwards or is rotated, depending upon the direction in which the beam is to be thrown. By the proper combining of the shifting and rotary motions of the control handle it will be apparent that the lamp may be made to assume any intermediate angle between the azimuth and the vertical. With a little practice the adjusting actuation of the control handle becomes instinctive; the adjustments in both planes being both performed simultaneously by a twisting or cork-screw motion of the control handle.

To insure one or more of the operator's fingers engaging with the lock releasing segment 53 at all times, I preferably construct the segment 53 of large circumferential extent, and even contemplate dividing the operating handle into substantially two equal parts, one of which would constitute the lock releasing segment. The entering edges of the locking cross 58 may be slightly beveled to facilitate the entrance of this locking cross into the locking grooves 46 and 47 upon release of the segment 53 after completing a new adjustment of the lamp. These locking grooves are preferably quite small and are grouped close together, so as to afford a relatively fine adjustment of the lamp, if desired. In the construction illustrated, the sleeve 44 is only made sufficiently long to cover all of the locking grooves when the lamp is in its normal straight-ahead position. It will be obvious, however, that the sleeve may be extended to a sufficient length to insure the covering of all of the grooves in any position of the lamp.

From the fact that the lamp must necessarily be positioned well forward of the wind shield to afford ample room for adjustment, it will be evident that the lamp will be subjected to considerable vibration on the end of the projecting sleeve 4. With a view to providing a stauncher and more rigid support for the lamp and for the purpose of enhancing the appearance of the entire device I also contemplate extending the rotatable housing 3 back as a unit to the pivotal mounting support on the wind shield or body of the car as illustrated in Figures 7 and 8; whereby the lamp support is given maximum strength and rigidity. This modified arrangement may be devised for mounting on closed cars, as previously described, or may be devised for mounting on open cars. In this instance I have illustrated the latter embodiment, for the purpose of illustrating adaptations of my invention to both open and closed types of cars. The rotatable housing 3' is extended back to a suitable clamp bracket or other preferred form of bracket 65, which projects laterally from the side rail 66 of the wind shield 67. For universal application to different makes of cars, this bracket 65 is preferably of an adjustable clamp type and comprises a substantially semi-circular clamping member 68 which is adapted to be rigidly clamped to the side rail 66 by a co-operating adjustable clamping member 69, which is adapted to embrace the other side of the wind shield rail 66. The clamping member 69 is formed with a laterally projecting plate extension 71 through which pass screws 72 or the like for clamping the member 69 to the member 68 about the rail 66. The screws 72 tap into a web portion 73, which projects laterally from the clamping member 68, and which is formed at its end with two spaced hubs 74 and 75. The housing 3' is rotatably supported in the forward hub 74 by the provision of a reduced journal extension 76 on the rear end of the housing, which extends through the hub 74. The journal extension 76 is extended into the intervening space between the hubs 74 and 75, where it is screw threaded for the reception of an adjusting nut 77 and a lock nut 78. A washer 79 is preferably interposed between the adjusting nut 77 and the end of the hub 74. By the manipulation of the adjusting nut 77 the shoulder 81 on the housing 3' may be drawn up against the end of the hub 74 under any desired degree of tension, so as to take all play out of the joint and at the same time insure an easy, firm rotation of the housing 3' in the bracket hub.

The rear bracket hub 75 is threaded internally for the reception of the stationary sleeve 4'. The sleeve may be pinned or keyed in the hub 75 to prevent unloosening of the screw threaded end of the sleeve from within the hub. The extreme end of the sleeve 4' is formed with a reduced portion 82, which is extended into the annular space between the journal extension 76 and the operating shaft 25' so as to form a co-extensive, water-tight connection between the sleeve 4' and the housing 3'. A spacing sleeve 83 guides the operating shaft 25' in the end of the sleeve 4'.

In this present construction I have illustrated a modified method of forming the locking serrations or holes in the end of the stationary sleeve 4'. In lieu of the longitudinal and transverse locking grooves described in the previous embodiment, I contemplate forming the end of the sleeve with a plurality of individual locking holes 84, preferably of circular form, which may consist of depressions in the body of the sleeve, or holes extending entirely through the sleeve, as shown. In this form, the locking lever 45' is provided with a locking pin 85 of circular form for engaging in the holes 84. The construction and arrangement of the operating handle 5 and sleeve 44 are substantially as previously described.

In this present construction I have also illustrated a system of interchangeable stems 2' for universally clamping or otherwise fastening to the various stock designs of spot lamps now on the market; whereby the present control device may be sold to motorists as a separate appliance—independent of the spot lamp—in order that the motorist may mount on the control device any particular form or type of spot lamp which he may possess as regular equipment on his car. The stem 2' is formed at its upper end with a semi-circular clamping portion 86, with which co-operates a semi-circular clamping band 87 (see Figure 9). These two clamping members are adapted to be releasably clamped together by screws 88 which extend through laterally projecting lugs 89, formed on the ends of the clamping members. This type of stem is adapted for mounting a particular design of spot lamp provided with a projecting knob 91, about which the clamping members are adapted to engage. Stems may also be provided having these clamping members inclined to the axis of the stem for engaging over diagonally projecting knobs 91. These stems may be provided in different heights for mounting different sizes of spot lamps, and may be provided with different sizes of clamps 86—87 for engaging different sizes of knobs 91. The stems are all adapted for interchangeable mounting in the rotatable head or housing 3' by extending the end of the stem down through the bottom of the housing and providing a cap nut 92 for threading over the end of the stem. Each stem is slotted longitudinally from its end, as indicated at 93, to receive the key 94 which projects inwardly from the bore of the pinion 16'. The pinion 16' may be formed with a depending flange 95 for engaging over the upper end of the internal hub 15, for retaining the pinion centered during substitution of stems. It will be obvious that other types of stems may be provided, having inclined mounting plates or their equivalents, similar to the construction illustrated in Figure 2, or having various other forms of mechanical fastening means for conveniently mounting the different forms of spot lamps.

It will be apparent that my invention is capable of various modifications and rearrangements without departing from the essence thereof, and I intend that such modifications and rearrangements shall be included within the terms and scope of the appended claims.

I claim:

1. In combination, a supporting member for mounting on or adjacent the windshield of an automobile, a shaft extending through said supporting member, a housing at one end of said shaft and rotatable therewith concentrically about the axis of said shaft, a stem projecting from said housing and adapted to support a spot lamp, a control handle at the other end of said shaft, said control handle and said shaft having joint reciprocatory motion along the axis of said shaft or rotational motion concentric with the axis of said shaft, and gearing connecting said shaft with said stem whereby the reciprocatory motion of said handle rotates said stem about its individual axis and rotational motion of said handle throws said stem and said lamp laterally to either side of the axis of said shaft.

2. In combination, a supporting member for mounting on or adjacent the windshield of an automobile, a shaft carried by said supporting member and arranged to extend in a direction generally parallel with the chassis of the automobile, a housing supported at the front end of said shaft and rotatable about the axis of said shaft, a pivotal member journaled in said housing and supporting a spot lamp, a first gear member on said pivotal member for rotating the same, a second gear member movable by said shaft and adapted for transmitting lamp adjusting motion from said shaft to said first gear member, and a control handle mounted on the rear end of said shaft and movable therewith, said handle being operative to reciprocate or axially rotate said shaft, whereby said pivotal member may be revolved in said housing or said housing may be turned over.

3. In combination, a supporting member for mounting on or adjacent the windshield of an automobile, a shaft carried by said supporting member and adapted to extend in a direction generally towards the front of the automobile, a housing at the front end of said shaft, a pivotal member mounted in said housing and supporting a lamp, a first gear element for adjusting said pivotal member, a second cooperating gear element associated with the outer end of said shaft, and a control handle carried on the inner end of said shaft and movable therewith for reciprocating said shaft back and forth in said housing and for axially rotating said shaft.

4. In combination, a mounting member for mounting on or adjacent the windshield of an automobile, a shaft carried by said mounting member and arranged to project in a direction generally towards the front of the automobile, a supporting member at the front end of said shaft, a pivotal member mounted in said supporting member for carrying a lamp, gearing adapted to transmit motion from said shaft to said pivotal member, and a control handle mounted on the other end of said shaft and operative to reciprocate and axially rotate said shaft.

5. In combination, a stationary tubular member, a shaft having bearing support in said tubular member, a rotatable housing journaled on one end of said tubular member, a stem journaled in said housing and projecting therefrom at an angle to the axis of said shaft, a spot lamp carried on said stem, a first gear element on said stem within said housing for adjusting said lamp, a second gear element on the outer end of said shaft adapted to rotate said first gear element, and a control handle on the inner end of said shaft and movable therewith, said handle being operative to reciprocate and rotate said shaft.

6. In combination, a stationary sleeve, a shaft having bearing support in said sleeve, a housing journaled on the forward end of said sleeve for rotational motion concentric with said shaft, a stem journaled in said housing and projecting therefrom at an angle to said shaft, a spot lamp carried by said stem, a pinion on said stem, a rack moving with said shaft for rotating said pinion, a control handle at the rear end of said shaft, said control handle having reciprocatory motion along the axis of said shaft and rotational motion concentric with said shaft, and a locking member movable with said handle and engageable with locking means on said stationary sleeve.

7. In combination, an operating shaft, a housing at one end of said shaft, a control handle mounted on the other end of said shaft, a stem journaled in said housing, a spot lamp supported on said stem, gear mechanism in said housing connecting said shaft and stem whereby axial motion of said shaft causes rotary motion of said stem about its own axis, means for rotatably supporting said housing whereby rotation of said shaft causes rotation of said stem about the axis of the shaft, and locking means for locking the parts against either motion.

8. In combination, an operating shaft, a housing at one end of said shaft, a control handle on the other end of said shaft, a stem journaled in said housing, a spot lamp supported on said stem, rack and pinion mechanism in said housing connecting said shaft and stem whereby rectilinear movement of said handle causes rotation of said stem about its own axis, means for rotatably supporting said housing whereby rotation of said handle causes rotation of said stem about the axis of the shaft, and a single locking means for locking the parts against either motion.

9. In combination, an automobile body, a stationary mounting sleeve mounted on or adjacent the windshield of said automobile body, a shaft extending substantially horizontally through said sleeve and in a direction substantially parallel with the length of said automobile body, a housing journaled on the forward end of said mounting sleeve for rotation concentrically about the axis of said shaft, a stem journaled in said housing and projecting therefrom at an angle to the axis of said shaft, a spot lamp carried on the projecting end of said stem, a control handle rigidly mounted on the rear end of said shaft and operable to rotate or reciprocate said shaft, and transmission mechanism in said housing for transmitting the motion of said shaft to said stem.

10. In combination, a supporting member adapted for mounting on or adjacent the windshield of an automobile, a shaft carried by said supporting member and arranged to extend in a direction substantially parallel with the chassis of the automobile, said supporting member rigidly holding said shaft in a predetermined substantially horizontal plane, a housing carried by said supporting member in proximity to the windshield, said shaft extending into said housing, a stem journaled in said housing with its axis extending substantially transversely to the axis of said shaft, a spot lamp carried on said stem, a pinion on said stem, a rack on the end of said shaft meshing with said pinion, and a handle fixedly mounted on the rear end of said shaft and operable to adjust said lamp by reciprocable motion substantially parallel with the chassis of the automobile.

11. In combination, an operating shaft, an operating handle at one end of said shaft, said operating handle having rotational and rectilinear motion for correspondingly moving said shaft, a housing at the other end of said shaft, a rotatable stem mounted in said housing, a spot lamp carried on the projecting end of said stem, and gear mecha nism in said housing adapted to transmit adjusting motion from said shaft to said stem, the two motions of said handle being operable to adjust said lamp in two distinct planes of movement.

12. In combination with an automobile body having a windshield, a tubular mounting member supported on said body adjacent said wind shield, a reciprocatory shaft extending substantially horizontally through said tubular mounting member in the general direction of the length of said automobile body, an operating handle on the rear end of said shaft having rotational and rectilinear motions and adapted to rotate said shaft about its horizontal axis of reciprocation, an enclosed housing supported at the forward end of said shaft, a stem journaled in said housing and projecting therefrom, a spot lamp carried on the projecting end of said stem, a gear wheel cooperating with said stem within said housing, and a gear element cooperating with said shaft for rotating said gear wheel.

13. In combination, an automobile body comprising a windshield corner post having a hole extending therethrough, a tubular mounting member fixedly secured to said corner post in alignment with said hole, a housing supported by said tubular mounting member, a rotatable and reciprocable operating shaft passing through said tubular mounting member, an operating handle mounted on the inner end of said shaft, a pivotal member mounted in said housing, a spot lamp supported on said pivotal member, and gearing in said housing operatively connecting said shaft with said spot lamp, said shaft having two paths of operating action, one to move said spot lamp about one axis and the other to move it about another axis.

14. In combination, an automobile comprising a windshield corner post having a hole extending therethrough, a tubular mounting member secured to said corner post in alignment with said hole, a rotatable member supported by said tubular mounting member, an axially rotatable and reciprocable shaft passing through said tubular mounting member and projecting into the interior of the body, an operating handle mounted on the inner end of said shaft, a pivotal member pivotally connected to said rotatable member, a spot lamp connected to said pivotal member, and means operatively connecting the outer end of said shaft with said spot lamp whereby reciprocatory motion of said handle and shaft is operative to swing said lamp horizontally to point to either side of the automobile, axial rotary motion of said handle transmitting rotary motion to said rotatable member and lamp for adjustment in a vertical plane.

15. In combination, an automobile body comprising a windshield corner post having a hole extending therethrough, a tubular mounting member fixedly secured to said corner post in alignment with said hole, a rotatable member pivotally supported on said tubular mounting member, a rotatable and reciprocable shaft passing through said tubular mounting member, an operating handle fixed to the inner end of said shaft, a spot lamp, a pivotal member between said spot lamp and said rotatable member, and means operatively connecting the outer end of said shaft with said spot lamp, said shaft transmitting all operating motion from said handle to said spot lamp whereby reciprocation of said handle is operative to adjust said spot lamp in one plane and axial rotation of said handle is operative to adjust said spot lamp in another plane.

16. In combination, a lamp, control mechanism having translational and angular motion for adjusting said lamp, and locking means comprising a plurality of locking shoulders for locking said control mechanism against translational motion and for positively locking said handle against angular motion in either direction.

17. In combination, a lamp, control mechanism having translational and angular motion for adjusting said lamp, and locking means comprising a plurality of selective locking recesses for positively locking said control mechanism against translational motion in any direction and for locking said control mechanism against angular motion.

18. In combination, a lamp, a control handle for adjusting the lamp having an operating motion whereby said handle is displaced from one position to another, and locking means comprising a plurality of locking shoulders and a cooperating detent member engageable therewith for positively locking said control handle against said displacement motion in either direction.

19. In combination, a lamp, an operating handle having an adjusting motion for actuating said lamp, locking mechanism for said handle, a movable segment associated with a recess in said handle and normally projecting from the periphery of said handle, and means operatively connecting said segment with said locking mechanism for actuating the latter when said segment is pressed into said recess.

20. In combination, a lamp, an operating handle having an adjusting motion for actuating said lamp, said handle being of circular formation and having a notched periphery, a movable segment adapted to be received in said notch, and locking mechanism controlled by said segment.

21. In combination, a stationary tubular member, a lamp, an operating shaft for said lamp extending through said tubular member, a control handle on said shaft, said control handle having translational and rotational adjusting motion, a locking pawl carried by said handle, and locking means associated with said tubular member and comprising a plurality of locking recesses extended axially and annularly of said tubular member.

22. In combination, a stationary sleeve, a lamp, an operating shaft extending through said sleeve for operating said lamp, a control handle on said shaft having translational and rotational motion, said control handle being of generally circular formation and having a recess in its periphery, a segment movable in said recess, a locking pawl controlled by said segment, and a plurality of cooperating locking recesses associated with said stationary sleeve and disposed axially and annularly thereof.

23. In combination, a lamp, a control member having translational and rotational motion for adjusting said lamp, a locking surface having a plurality of locking recesses therein, a detent moving with said control member and adapted to engage the locking recesses to positively lock said member against translational or rotational motion.

24. In combination, a lamp, a control handle having translational and rotational motion for adjusting said lamp, a cylindrical locking surface having locking recesses arranged longitudinally and annularly, a detent moving with said handle and adapted to engage in said recesses for locking said handle against translational or rotational motion, and a detent releasing member normally projecting from said handle, said latter member being released by pressing the same inwardly toward the central part of said handle.

In witness whereof I hereunto subscribe my name this 7th day of May, 1920.

CAMERON A. WHITSETT.